(12) United States Patent
Gamroth et al.

(10) Patent No.: US 10,880,107 B2
(45) Date of Patent: Dec. 29, 2020

(54) TEMPORARY SERVICE AND EQUIPMENT INSTALLATION NETWORK FOR A BUILDING

(71) Applicant: Johnson Controls Technology Company, Auburn Hills, MI (US)

(72) Inventors: Timothy C. Gamroth, Dousman, WI (US); Nicholas J. Schaf, Hartland, WI (US); Joseph Piccolo, III, Fitzwilliam, NH (US)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

(21) Appl. No.: 15/963,868

(22) Filed: Apr. 26, 2018

(65) Prior Publication Data

US 2018/0316513 A1 Nov. 1, 2018

Related U.S. Application Data

(60) Provisional application No. 62/490,811, filed on Apr. 27, 2017.

(51) Int. Cl.
*H04L 12/12* (2006.01)
*H04L 12/28* (2006.01)

(52) U.S. Cl.
CPC .......... *H04L 12/12* (2013.01); *H04L 12/2807* (2013.01); *H04L 12/2827* (2013.01); *H04L 12/2834* (2013.01); *H04L 12/2838* (2013.01); *H04L 2012/285* (2013.01)

(58) Field of Classification Search
CPC ..... H04L 12/12; H04L 12/28; H04L 12/2807; H04L 12/2827; H04L 12/2834; H04L 12/2838; H04L 2012/285

USPC .......................................................... 370/254
See application file for complete search history.

(56) References Cited

U.S. PATENT DOCUMENTS

| 8,356,091 B2 * | 1/2013 | Belz .................. H04L 41/12 709/223 |
| 8,774,776 B1 * | 7/2014 | Ornstein ............. H04M 19/04 455/414.1 |
| 10,684,030 B2 * | 6/2020 | Waseen .............. H04W 4/70 |

(Continued)

FOREIGN PATENT DOCUMENTS

TW 201129155 A * 8/2011

*Primary Examiner* — Rownak Islam
(74) *Attorney, Agent, or Firm* — Foley & Lardner LLP

(57) ABSTRACT

A temporary building network system for forming a temporary network for a building includes a first network device and a second network device. The first network devices includes an energy storage device configured to power the first network device using stored energy, a wireless radio configured to communicate with the second network device, and an indicator device configured to indicate a wireless radio connection strength to a user. The first network device includes a processing circuit configured to cause the wireless radio to communicate with the second network device via the temporary network, determine the wireless radio connection strength for the wireless connection between the first network device and the second network device based on a communication with the second network device via the temporary network, and cause the indicator device to indicate the determined wireless radio connection strength to the user.

23 Claims, 8 Drawing Sheets

(56) References Cited

U.S. PATENT DOCUMENTS

| | | | | |
|---|---|---|---|---|
| 2003/0231585 A1* | 12/2003 | Motegi | ............... | H04L 45/24 |
| | | | | 370/229 |
| 2005/0181744 A1* | 8/2005 | Lin | ............... | H04B 1/034 |
| | | | | 455/90.3 |
| 2007/0297421 A1* | 12/2007 | Huseth | ............... | H04L 41/0806 |
| | | | | 370/400 |
| 2013/0318583 A1* | 11/2013 | Baker | ............... | H04L 67/025 |
| | | | | 726/7 |
| 2015/0024769 A1* | 1/2015 | Chen | ............... | H04W 48/20 |
| | | | | 455/452.2 |
| 2015/0312833 A1* | 10/2015 | Gresset | ............... | H04W 48/17 |
| | | | | 370/329 |
| 2017/0180244 A1* | 6/2017 | Hodroj | ............... | H04L 69/22 |
| 2018/0368058 A1* | 12/2018 | Huang | ............... | H04W 76/10 |

\* cited by examiner

TEMPORARY SERVICE AND EQUIPMENT INSTALLATION NETWORK FOR A BUILDING

CROSS-REFERENCE TO RELATED PATENT APPLICATION

This application claims the benefit of and priority to U.S. Provisional Patent Application No. 62/490,811 filed Apr. 27, 2017, the entire disclosure of which is incorporated by reference herein.

BACKGROUND

The present invention relates generally to heating, ventilation, and air conditioning (HVAC) systems. More specifically, the present invention relates to building networks for HVAC systems.

In a building, various pieces of building equipment of the HVAC system can communicate via a network within the building. The network may be a wired network, a wireless network, or a combination of both. In some embodiments, to properly operate, the pieces of building equipment must connect to the network in order to communicate data among each other or to other systems or devices connected to the network. When a building is being constructed, the building may not have the necessary network infrastructure to facilitate the network for the HVAC systems. In this regard, it may be difficult to test or install the pieces of building equipment when the building is being constructed.

SUMMARY

One implementation of the present disclosure is a temporary building network system for a building. The system includes network devices forming a temporary network for the building, the network devices include a first network device and a second network device. The first network device includes an energy storage device configured to store energy and power the first network device using the stored energy, a wireless radio configured to communicate with the second network device via the temporary network, and an indicator device configured to indicate a wireless radio connection strength to a user for a wireless connection between the first network device and the second network device. The first network device includes a processing circuit configured to cause the wireless radio to communicate with the second network device via the temporary network. The processing circuit is configured to determine the wireless radio connection strength for the wireless connection between the first network device and the second network device based on a communication with the second network device via the temporary network and cause the indicator device to indicate the determined wireless radio connection strength to the user.

In some embodiments, the energy storage device is configured to power the wireless radio, the indicator device, and the processing circuit using the stored energy.

In some embodiments, the temporary network is a wireless mesh network. In some embodiments, the processing circuit is configured to cause the wireless radio to communicate with the network devices to form the wireless mesh network.

In some embodiments, the first network device further includes a wired communications interface configured to communicate, via one or more wires, with a building device. In some embodiments, the processing circuit is configured to connect the building device to the temporary network by receiving data from the building device via the wired communications interface and causing the received data to be communicated via the temporary network via the wireless radio.

In some embodiments, the first network device further includes a cellular communications port configured to connect a cellular dongle to the first network device. In some embodiments, the processing circuit of the first network device is configured to connect the temporary network to a second network by communicating with one or more cellular communications devices via the cellular dongle connected to the cellular communications port.

In some embodiments, the first network device further includes a permanent power circuit configured to power the first network device using power received from a permanent power source.

In some embodiments, the first network device further includes a wired communications port configured to connect to a second network via one or more wires. In some embodiments, the processing circuit is configured to connect the temporary network to the second network by communicating with the second network via the wired communications port.

In some embodiments, the processing circuit is configured to cause the wireless radio to connect a building device to the temporary network by wirelessly communicating with the building device via the wireless radio.

In some embodiments, the building device is at least one of an environmental control device configured to control an environmental condition of the building or a mobile user device associated with the user.

In some embodiments, the processing circuit is configured to determine that the first network device is connected to a second network via at least one of a wired communications port of the first network device configured to connect the first network to the second network via one or more wires or a cellular communications port of the first network device configured to connect the first network device to the second network via a cellular dongle connected to the cellular communications port. In some embodiments, the processing circuit is configured to enable one or more gateway functions causing the first network device to operate as a gateway between the second network and the temporary network.

In some embodiments, the first network device further includes a selector configured to receive a selection, from a user, to operate the first network device as the gateway. In some embodiments, the processing circuit is configured to enable the one or more gateway functions causing the first network device to operate as the gateway between the second network and the temporary network in response to a determination that the selection to operate the first network device as the gateway is received from the user via the selector. In some embodiments, the second network is the Internet.

In some embodiments, the one or more gateway functions include at least one of a network address translation (NAT) function, a dynamic host configuration protocol (DHCP) server function, and a domain name service (DNS) function.

Another implementation of the present disclosure is a first network device for a temporary building network of a building. The first network device includes an energy storage device configured to store energy and power the first network device using the stored energy, a wireless radio configured to communicate with a second network device of the temporary network via the temporary network, an indicator device configured to indicate a wireless radio connection strength to a user for a wireless connection between the first network device and the second network device, and a processing circuit. The processing circuit is configured to cause the wireless radio to communicate with the second network device via the temporary network, determine the wireless radio connection strength for the wireless connection between the first network device and the second network device based on a communication with the second network device via the temporary network, and cause the indicator device to indicate the determined wireless radio connection strength to the user.

In some embodiments, the temporary network is a wireless mesh network. In some embodiments, the processing circuit is configured to cause the wireless radio to communicate with network devices including the second network device to form the wireless mesh network.

In some embodiments, the first network device further includes a wired communications interface configured to communicate, via one or more wires, with a building device. In some embodiments, the processing circuit is configured to connect the building device to the temporary network by receiving data from the building device via the wired communications interface and causing the received data to be communicated via the temporary network via the wireless radio.

In some embodiments, the first network device further includes a cellular communications port configured to connect a cellular dongle to the first network device. In some embodiments, the processing circuit is configured to connect the temporary network to a second network by communicating with one or more cellular communications devices via the cellular dongle connected to the cellular communications port.

In some embodiments, the processing circuit is configured to determine that the first network device is connected to a second network via at least one of a wired communications port of the first network device configured to connect the first network device to the second network via one or more wires or a cellular communications port of the first network device configured to connect the first network device to the second network via a cellular dongle connected to the cellular communications port. In some embodiments, the processing circuit is configured to enable one or more gateway functions causing the first network device to operate as a gateway between the second network and the temporary network.

Another implementation of the present disclosure is a method for communicating via a temporary network of a building. The method includes powering, by a first network device, the first network device via an energy storage device of the first network device using energy stored by the energy storage device, causing, by the first network device, a wireless radio of the first network device to communicate with the second network device via the temporary network, and determining, by the first network device, a wireless radio connection strength for the wireless connection between the first network device and the second network device based on a communication with the second network device via the temporary network. In some embodiments, the method includes causing, by the first network device, an indicator device of the first network device to indicate the determined wireless radio connection strength to the user, receiving, by the first network device, data from a building device via a wired communications interface of the first network device, and causing, by the first network device, the received data to be communicated via the temporary network via the wireless radio of the first network device.

In some embodiments, the temporary network is a wireless mesh network. In some embodiments, the method further includes causing, by the first network device, the wireless radio of the first network device to communicate with network devices including the second network device to form the wireless mesh network.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Figure 1:
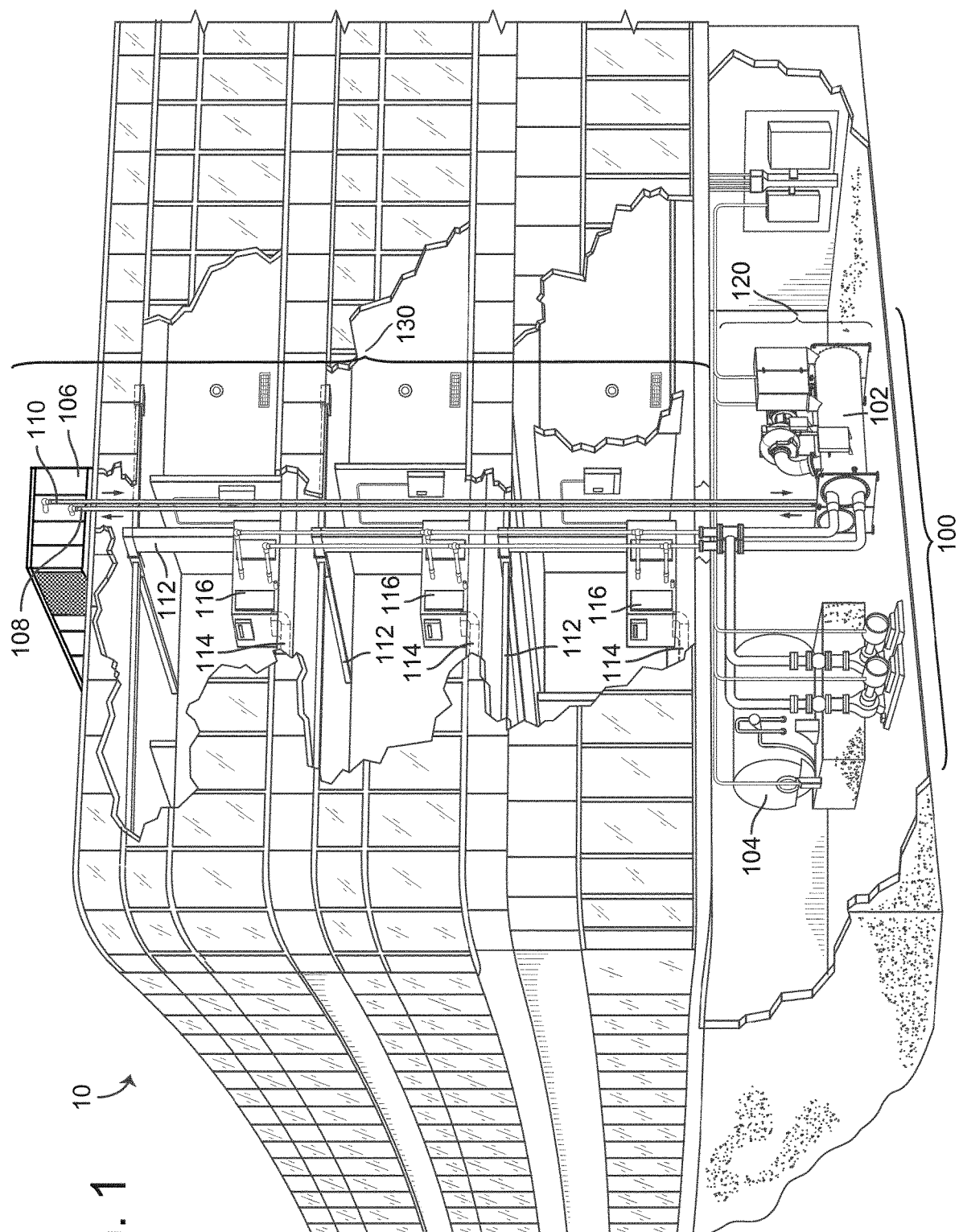
FIG. 1 is a drawing of a building equipped with a HVAC system, according to an exemplary embodiment.

Referring generally to the FIGURES, a temporary service and installation network for installing building equipment in a building is shown, according to various exemplary embodiments. In many buildings, building equipment needs to be connected together in addition to being connected to external networks that may provide centralized services when the building equipment is being installed or tested. The building equipment may need to be connected to both on-premises networks (e.g., on premises cloud) and off-premises networks (off-premises cloud) during installation and/or testing. Unfortunately, for many buildings, during construction of the building and/or installation of the building equipment, this connectivity may be unavailable.

During installation of equipment in a building, various types of connectivity may be necessary for the equipment being installed. The connectivity may include equipment-to-equipment connectivity, equipment-to-the cloud connectivity, mobile device to the cloud, and mobile devices-to-equipment in the building. Equipment-to-equipment connectivity may be necessary since during installation, equipment may need to communicate with each other to verify proper operation before network infrastructure of a building is in place. In various embodiments, building equipment may need to transmit commands to each other for a technician to properly setup the equipment. Equipment-to-the cloud connectivity may be necessary since equipment may need to be connected to the cloud to perform optimized service operations (e.g., remote configuration, remote status reporting, receiving remote control operations, cloud service testing, access diagnostic tools, etc.).

Mobile device-to-cloud connectivity may be necessary since equipment installers and service individuals may need connectivity throughout the building for their mobile devices to access cloud services (e.g., the Internet) that are used to streamline installation and servicing (e.g., inspection and/or commissioning tools, configuration tools, remote equipment status and/or control, etc.). In various embodiments, mobile device-to-equipment connectivity may be necessary since installers and service individuals need connectivity throughout the building to directly monitor, configure, and control equipment via mobile devices (e.g., running diagnostics, equipment status and/or control, remote configuration changes, etc.) while installing and servicing even when cloud connections are not available.

To provide the necessary types of network connectivity for installing equipment in a building, a temporary service network may be necessary that enables connectivity for both equipment and for mobile devices of equipment installers and service individuals. Giving equipment installers and service individuals a temporary network may improve equipment installation and equipment servicing by reducing installation time and installation costs.

To provide a temporary service and installation network for a building, a plurality of network boxes (e.g., portable temporary networking devices) may be deployed in a building that create a service network. The network boxes can be deployed when a technician is servicing a building and needs a network or when a building is being built and there is no permanent network infrastructure. This service network may provide functionality for device-to-device communication, device-to-cloud communication, mobile device-to-device communication, and mobile device-to-cloud communication. The service network may be a wireless network that is ad-hoc, temporary (e.g., easily installed and removed as needed), and/or is a mesh network. Equipment and mobile devices can connect to the service network via a Wi-Fi or Ethernet connection. Further, everything connected to the service network can talk directly to each other, ad-hoc. In some embodiments, everything connected to the service network can communicate with the Internet via a cellular or Ethernet connection that one or more of the network boxes includes. In this regard, one or more of the network boxes can act as a gateway to the Internet.

The plurality of network boxes can be deployed in a building to create a wireless mesh network between network boxes as well as provide connections to equipment, mobile devices, and to the Internet. The service network can easily be created by placing these network boxes in various places of a building. The plurality of network boxes may automatically connect with each other and form the service network. In some embodiments, one or more of the plurality of network boxes act as Wi-Fi access points. A technician can connect their smartphone to the Wi-Fi access point to access the Internet or directly access building devices. Each of the network boxes can also provide equipment and/or Internet connections. In some embodiments, a building may have enough network boxes to generate a service network that allows communication such that all network boxes can communicate with each other and all building equipment in the building can be communicatively coupled.

Each network box may connect to building equipment via an Ethernet connection. The network boxes may also each provide a Wi-Fi access point for mobile devices to connect to. Further, each network box may enable mobile devices connected via the access point and building equipment connected via the Ethernet access to the Internet. Each network box may have access to the Internet itself and/or communicate to another network box to access the Internet via a network (e.g., ad hoc, mesh, etc.) of network boxes. In some embodiments, one or more of the network boxes has a wired Ethernet connection to the Internet. In various embodiments, one or more of the network boxes have a USB connection that enables a cellular dongle to communicate via the Internet. In various embodiments, the cellular dongle is a cellular dongle offered by cellular carriers such as VERIZON®, AT&T®, SPRINT®, etc.

Each of the plurality of network boxes may be powered via an AC power plug, a battery, a DC power plug, and/or a combination thereof. In various embodiments, the network box receives power directly from the equipment that it is connecting to the installation network. In some embodiments, a network box may include a battery and an AC power plug. In this regard, the network box can connect to the installation network even when not connected to an AC power outlet. This may allow an individual installing the network box to roam a building holding the network box. The network box may include an indicator that indicates whether the network box is within range of the service network (e.g., another network box). The indictor may activate whenever the wireless device can connect to another network box. This may allow a technician to create the service network since the technician can use the indicator to know when he has reached the wireless range limit of the network box.

When all of the equipment is installed and/or when networking infrastructure of the building is installed, the network boxes can be disconnected from the equipment they are connected to and gathered up. This may effectively uninstall and remove the service network. The network boxes can be deployed at a different building and/or job site that can utilize the service network, for this reason, the temporary service network is reusable.

The installation network can be used in various cases when a building network infrastructure is not available and/or is not installed in the building. Servicing and inspecting fire alarm systems may be one possible use for the installation network. Fire alarm systems may require a technician to test all smoke detectors installed throughout a building periodically (e.g., once a year) to ensure proper operation. In some cases, the inspection requires two technicians. For example, one technician may need to be located at the panel to monitor the activation of the smoke detectors while the second technician roams the building injecting smoke into each of the smoke detectors.

The service network may give a single technician the ability to test the fire system without the help of a second technician. The fire panel may be connected to the service network such that activity of the fire panel (e.g., smoke detector activations, equipment resets, etc.) can be monitored, verified, and/or controlled from a technician's smartphone while the technician injects smoke into each of the smoke detectors of the building. Further, the technician can send the inspection results via the smartphone to a cloud server. The inspection results may be entered and/or annotated by the technician and may include smoke detector activation results, failure notes, photos of deficiencies, etc. This may result in a quicker inspection that may be less labor intensive in addition to providing a customer with a higher quality fire system inspection with proof that all of the devices of the fire system tested operate correctly. This may further confirm that the technician has actually done their job and has tested all of the smoke detectors instead of only a portion of the smoke detectors of a building.

In many cases, the fire panel does not itself connect to the Internet, especially in the case of legacy fire panels. In this regard, using the service network to provide the fire panel with Internet connectivity may be necessary. Even when fire panels do have the ability to connect to the Internet, there may be cases when the fire panel encounters obstacles that prevent the fire panel from connecting to the Internet. For example, the fire panel may be located in a basement where cinder blocks may block cellular signals. Further, a building may have spotty or no cellular data coverage where the fire panel is located. In these cases, the temporary service and installation network and the plurality of network boxes may remedy the situation by providing the fire system and the fire panel with connectivity to the Internet.

Building Management System and HVAC System

Figure 2:
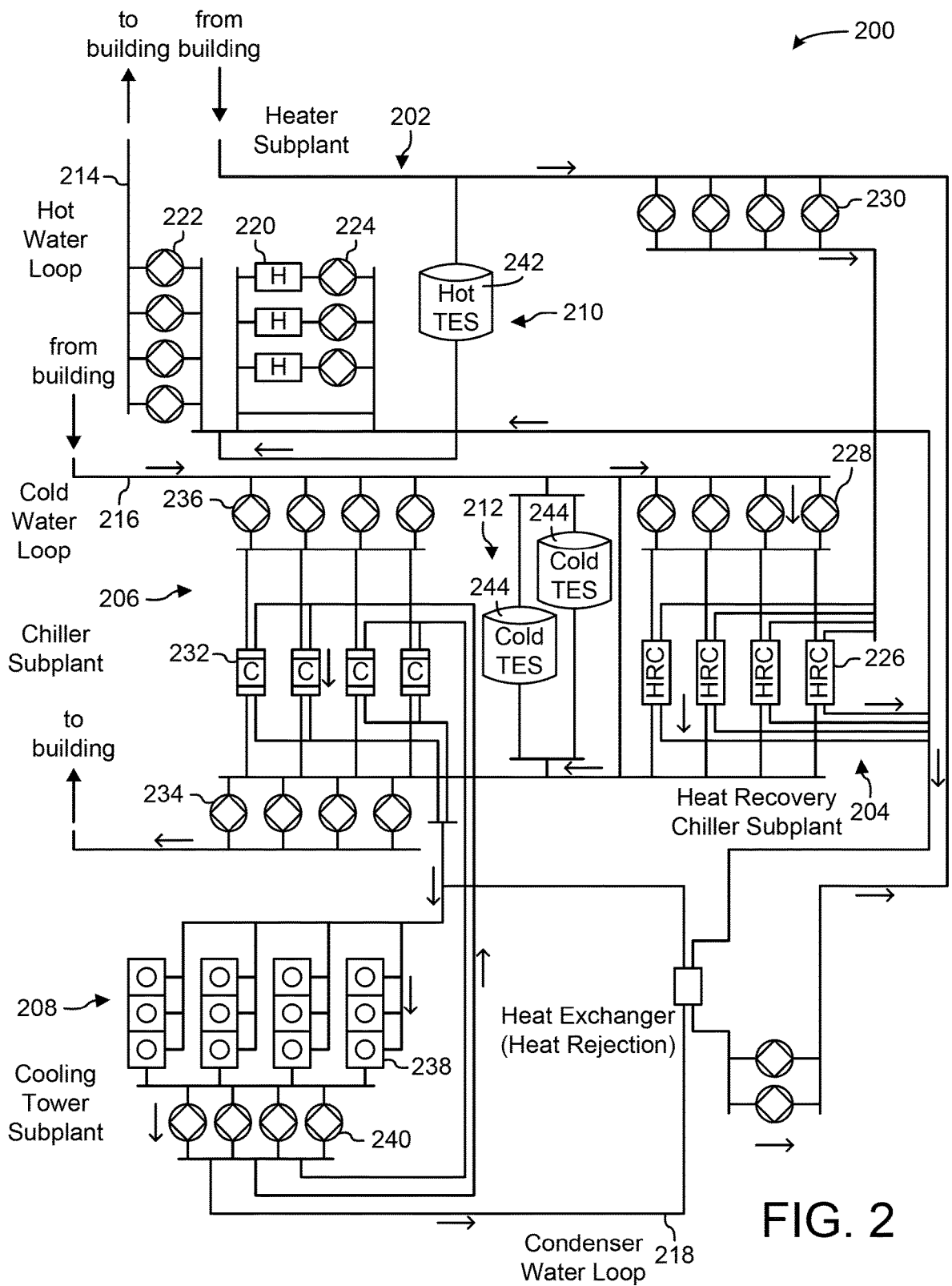
FIG. 2 is a block diagram of a waterside system that may be used in conjunction with the building of FIG. 1, according to an exemplary embodiment.
Figure 3:
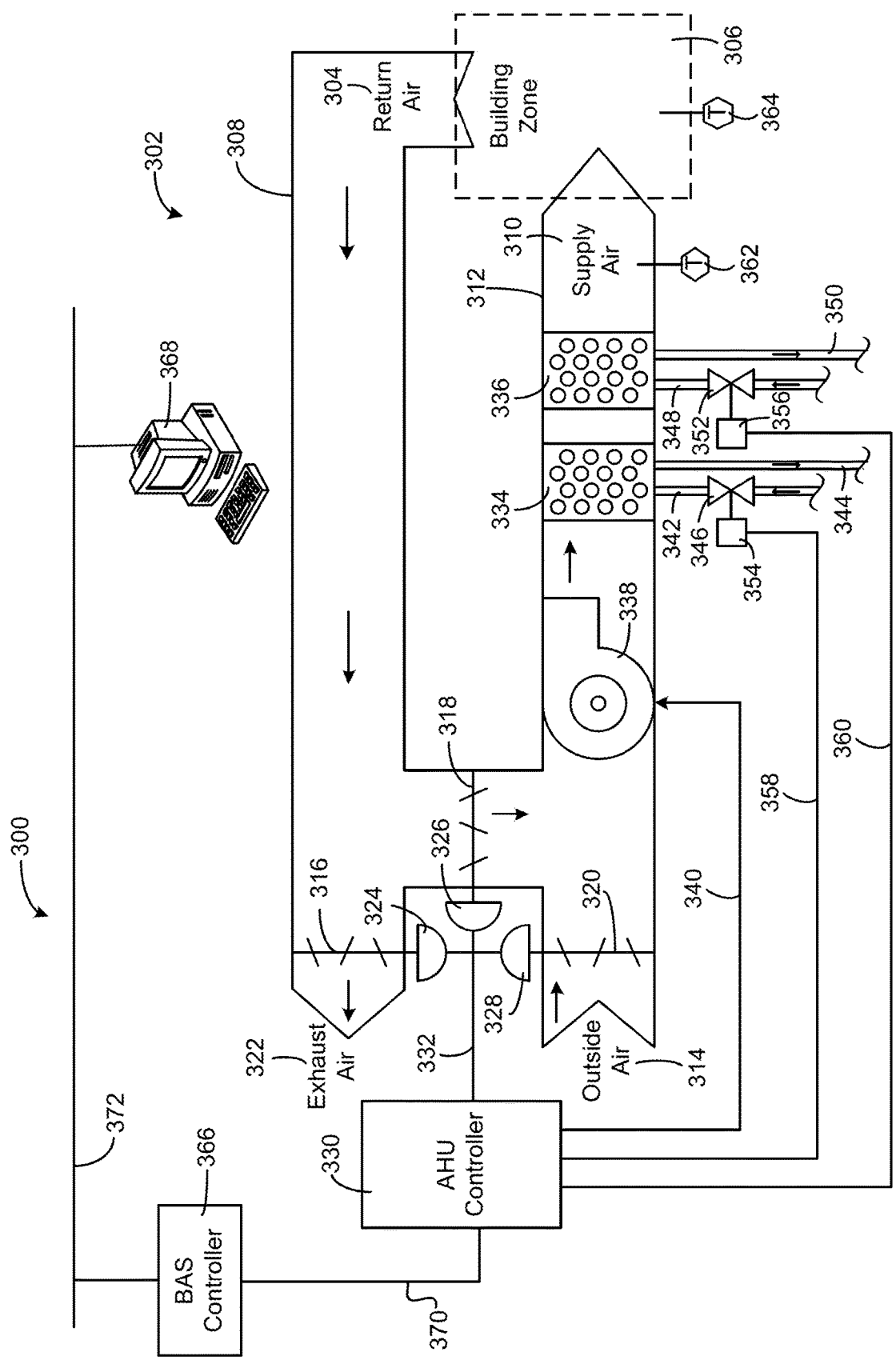
FIG. 3 is a block diagram of an airside system that may be used in conjunction with the building of FIG. 1, according to an exemplary embodiment.

Referring now to FIGS. 1-3, an exemplary building management system (BMS) and HVAC system in which the systems and methods of the present invention can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Temporary Network and Network Boxes

Figure 4:
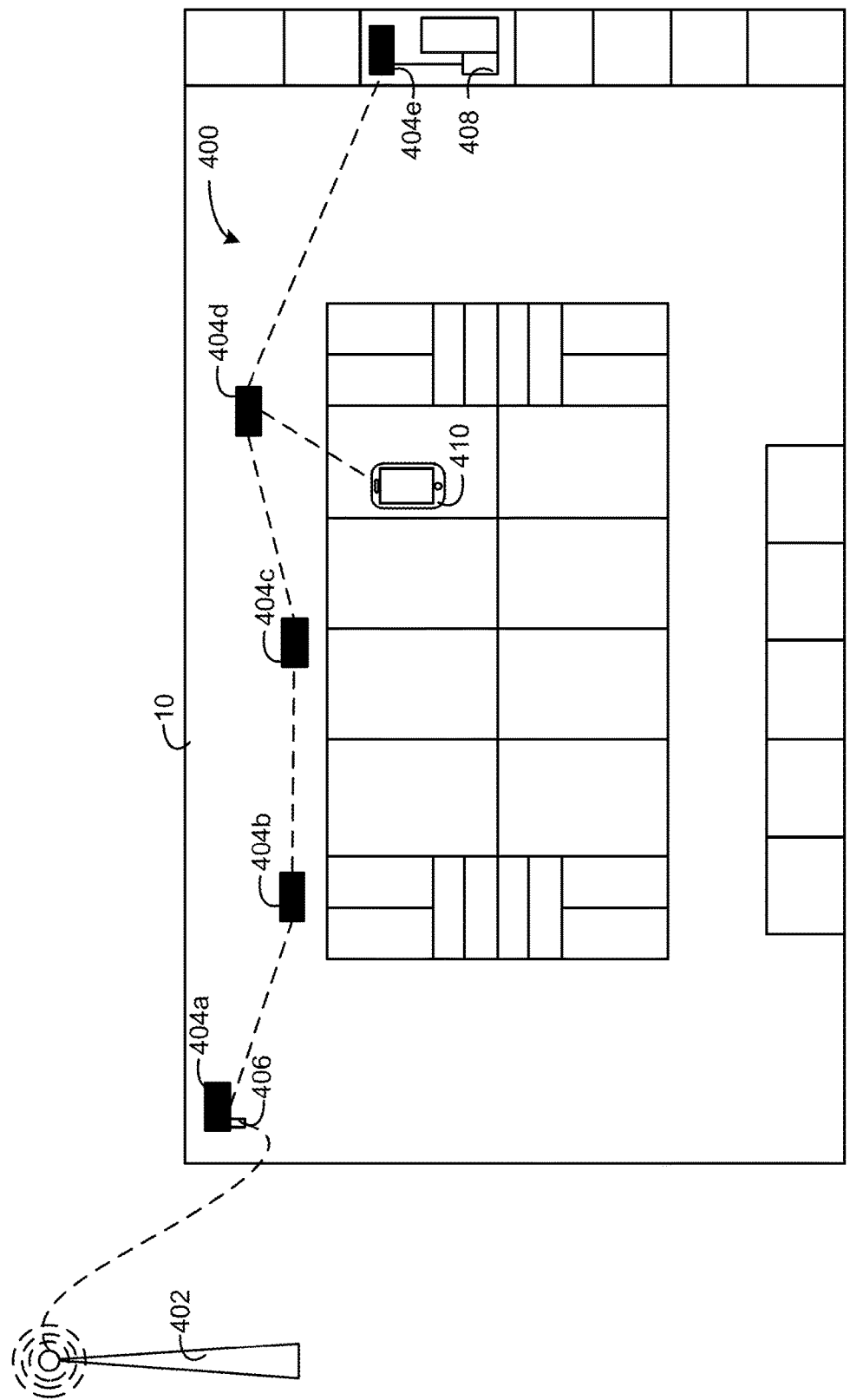
FIG. 4 is a block diagram of a service network in the building of FIG. 1, according to an exemplary embodiment.

Referring now to FIG. 4, a block diagram of a service network 400 is shown, according to an exemplary embodiment. FIG. 4 is shown to include a cell tower 402, network boxes 404a-e, building device 408, and user device 410. Network boxes 404a-e form network 400. Network 400 may be one or a combination of networks such as Wi-Fi, Bluetooth, Zigbee, LoRa, and/or any other wireless network. Network 400 may be an ad hoc network (e.g., MANET, VANET, SPANET, iMANET) and/or a mesh network and/or may enables network boxes 404a-e to communicate ad-hoc.

As can be seen in FIG. 4, each of the network boxes 404a-e communicate wirelessly ad-hoc with each other providing connection between building device 408 and cell tower 402. In FIG. 4, a building 10 is shown. The left side of building 10 may have cellular coverage by cell tower 402, however, the right side of building 10, where building device 408 is located, may have poor and/or no connection to cellular tower 402. Network boxes 404a-e include one network box that communicates with cell tower 402, network box 404a. In some embodiments, network box 404a may operate as a gateway for network boxes 404a-e to communicate with the Internet. Network box 404a may have connection to the Internet via cell tower 402. Based on communications between network boxes 404a-e, network boxes 404a-e may all have access to the Internet via network box 404a. Network boxes 404a-e may communicate to each other via Wi-Fi, Zigbee, LoRa, and/or any other wireless protocol or combination thereof. Further, building equipment 408 may have connection to the Internet via network box 404e while network box 404e may have connection to the Internet via network box 404a.

Network boxes 404a-e may automatically form a mesh network. For example, an installer may place network box 404a in building 10. Then, the installer may place network box 404b in building 10. Network box 404b can be configured to automatically form a mesh network with network box 404a. Similarly, an installer may place network box 404c in building 10 which is configured to automatically form a mesh network with network box 404b. The same process occurs when an installer places network boxes 404d and 404e in building 10.

Network box 404a is shown to include cellular dongle 406. Cellular dongle 406 may be any cellular dongle that is configured to communicate with cellular tower 402. In some embodiments, cellular dongle communicates to cell tower 402 via a 2G network, a 3G network, a LTE network, and/or any other kind of cellular network. Cellular dongle 406 may be a USB device that can be plugged into network box 404a, providing network box 404a with Internet access.

Cellular tower 402 may be any kind of cellular tower that communicates with smartphones and/or cellular dongles e.g., cellular dongle 406. Cellular tower 402 may be a cell tower owned, operated, and/or leased by network service providers such as VERIZON®, AT&T®, SPRINT®, etc. The cellular tower 402 may provide access to a wide area network (WAN) such as the Internet. By connecting to cellular tower, network box 404a can be configured to connect to the Internet and provide network boxes 404b-e access to the Internet.

User device 410 can be any type of user computing device. User device 410 can be a smartphone, a laptop, a technician device, tablet device, and/or any other computing device. Each of network boxes 404a-e may act as a Wi-Fi access point for user device 410. In this regard, user device 410 can connect via Wi-Fi to one of network boxes 404a-e (in FIG. 4 user device 410 is shown to be connected to network box 404d). User device 410 may have Internet connection via the access point since the network box providing user device 410 with the Wi-Fi connection may communicate to cellular tower 402 directly and/or through other network boxes. In FIG. 4, user device 410 is shown to be connected via Wi-Fi to network box 404d. Network box 404d may communicate with network box 404c, network box 404b, and network box 404a to access the Internet and/or another network provided by cellular tower 402.

Building device 408 may be any kind of HVAC, security, and/or fire prevention device and/or system. In some embodiments, building device 408 is one and/or a combination of AHU 106, VAVs 116, boiler 104, chiller 102, a thermostat, and/or any other building HVAC device. In some embodiments, building device 408 is a fire detector, a fire panel, a security camera, a security panel, and/or any other piece of building equipment. Building device 408 is shown to be connected to network box 404e. In some embodiments, building device 408 is connected to network box 404e via an Ethernet LAN connection. In various embodiments, network box 404e acts as a Wi-Fi access point and building device 408 connects to network box 404e via Wi-Fi.

In some embodiments, building device 408 can be a fire panel for building 10 that a technician can connect to the Internet via network 400. The technician may be any inspector or other individual who may want to verify the operation of the fire panel. The technician may have a cellular dongle (e.g., cellular dongle 406) that the technician can plug into network box 404a. The technician may move network box 404a to various points in building 10 to achieve a strong connection between cellular tower 402 and network box 404a. In some embodiments, network box 404a may support various network dongles (e.g., various network carriers) so that the technician can utilize various cellular dongles based on the geographic location of building 10 and the coverage offered by each of the network provides in the geographic location of building 10.

The technician may place another network box (e.g., network box 404b) within range of network box 404a. The technician can place another network box closer to the fire panel than network box 404a while still being within range of network box 404a. Network box 404b may automatically connect to network box 404a. The technician can repeat this process of placing network boxes until a path from the fire panel (e.g., building device 408) to cellular tower 402 is established. In some embodiments, the last network box, network box 404e may connect to the fire panel via Wi-Fi and/or via an Ethernet cable. In this regard, network boxes may be placed in building 10 until a path is formed that network box 404e can connect to the fire panel via at least one of Wi-Fi and/or Ethernet. In various embodiments, a technician device is connected to the fire panel, this technician device communicating between the fire panel and the network box 404e. This technician device may be utilized in testing building equipment 408. In some embodiments, the technician device communicates to the Internet through network boxes 404a-e.

Figure 5:
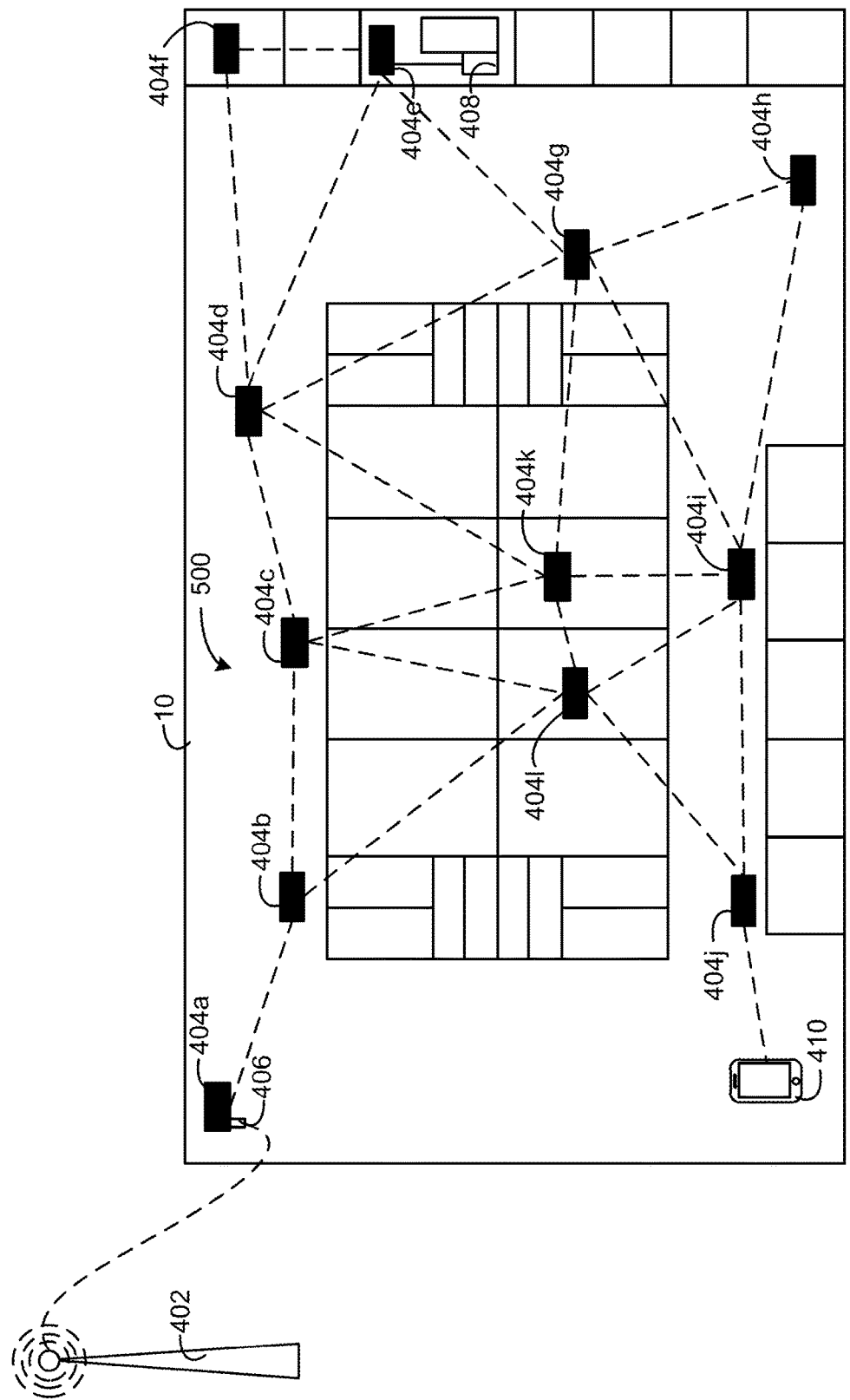
FIG. 5 is a block diagram of a mesh service network in the building of FIG. 1, according to an exemplary embodiment.

Referring now to FIG. 5, network boxes 404a-1 communicating in a mesh in building 10 are shown, according to an exemplary embodiment. Network boxes 404a-1 are shown to communicate in a mesh network 500 in building 10. Every device connected to mesh network 500 may be configured to communicate with every other device connected to mesh network 500, further, each device may be able to communicate to the Internet via mesh network 500. The mesh network may be a Wi-Fi mesh network, a Zigbee mesh network, a LoRa mesh network, and/or any other mesh network or combination thereof. Mesh network 500 and network 400 may be the same and/or similar networks. Mesh network 500 may provide a plurality of data packet routes through mesh network 500 between the various devices of mesh network 500. For example, building device 408 may have access to cellular tower 402 and/or the Internet via network box 404e, 404d, 404c, 404b, and 404a. However, if this path to cellular tower 402 is unavailable or is not a fast route for transmitting and/or receiving data, network box 404e may communicate via network box 404g, 404k, 404l, 404b, and 404a. There are multiple paths that may be utilized to transmit data to building device 408a from cellular tower 402 and/or from building device 408 to cellular tower 402.

In some embodiments, each and/or some of network boxes 404a-1 act as wireless access points. In this regard, in FIG. 5, network boxes 404a-1 cover the majority of building 10, adding the availability of a wireless network for mobile phones throughout building 10. For example, user device 410 is shown to communicate with network box 404j. In some embodiments, network boxes 404a-1 may be placed at various locations in building 10 that may have poor cellular connection with cell tower 402. This may allow a technician access to cellular tower 402 via mesh network 500. This may be useful for a technician when the technician is servicing equipment in building 10. In one example, the mesh network 500 may be useful in the case of testing various fire detectors in building 10. A technician inspecting the fire detectors may need Internet connection on the phone of the technician so that the technician can monitor the response of a fire panel to injecting smoke into various smoke detectors. In various embodiments, the technician may place network boxes 404a-1 in building 10 before beginning an inspection and can remove boxes 404a-1 from building 10 and reuse the network boxes in a different building.

Figure 6:
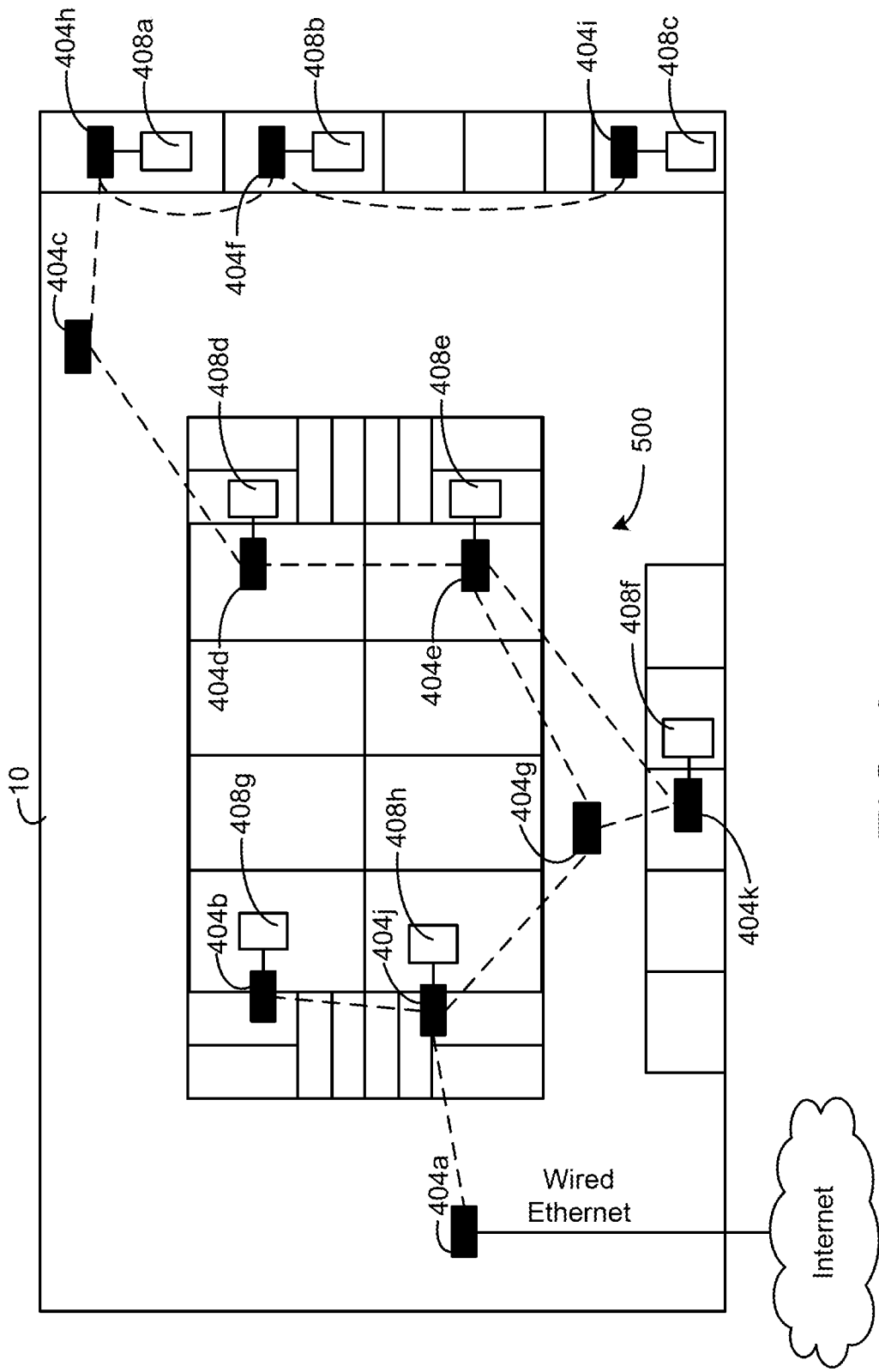
FIG. 6 is a block diagram of a mesh service network in the building of FIG. 1 connecting building equipment together, according to an exemplary embodiment.

Referring now to FIG. 6, is a block diagram of a mesh network 500 in building 10 connecting building devices together is shown, according to an exemplary embodiment. Mesh network 500 is shown to connect building devices 408a-h. In various embodiments, mesh network 500 may include one network box that has access to the Internet. In various embodiments, there are no building devices that have access to the Internet. In FIG. 6, network box 404*a* is shown to be connected to the Internet via a wired Ethernet connection. In this regard, mesh network 500 may be configured to extend an existing Internet connection of building 10 to other areas of building 10.

Each of building devices 408*a-e* can communicate via mesh network 500. In some embodiments, allowing building devices 408*a-e* to communicate with each other via mesh network 500, allowing a technician to install, test, debug, configure, and setup building devices 408*a-e* even when there is no permanent network infrastructure installed in building 10. For example, building device 408*g* may be a controller that generates control signals for building device 408*h*. When building 10 includes a permanent network infrastructure, building device 408*g* can be configured to send the control signals to building device 408*h* via the permanent network infrastructure. However, during the construction of building 10, there may be no network infrastructure in building 10. In this case, building device 408*h* may connect to network box 404*j* while building device 408*g* may connect to network box 404*b*. Network boxes 404*j* and 404*b* may facilitate communication between building devices 408*h* and 408*g*.

In FIG. 6, a network box of network boxes 404*a-k* is connected to each piece of building equipment, building devices 408*a-h*. Each network box 404*a-k* may be connected to a particular building device 408*a-h* via Wi-Fi, a Wi-Fi access point provided by each of the network boxes, or a wired connection to the network boxes 404*a-k*, such as Ethernet. Each network box may connect the building devices together allowing them to communicate, may connect the building devices to the Internet, and may further provide a Wi-Fi access point for a smartphone and/or other Wi-Fi enabled device. In various embodiments, building devices 408*a-k* may connect to their respective network boxes via an Ethernet connection. Each of network boxes 404*a-k* may automatically form mesh network 600. In various embodiments, a technician can deploy any number of network boxes, in some cases, to bridge the any communications gap between network boxes that are too far apart to connect.

Once all the networking devices have created a single service network all equipment on the service network can communicate with each other allowing full operation. The installer's smartphone can also connect to the service network via the Wi-Fi access point on any of the network boxes. This allows the installer convenient access to equipment status, monitor equipment, control, and configuration to aid in operational testing, debugging, and correction of issues. The installer can also increase the Wi-Fi coverage of the site by using additional network boxes. Once the building network infrastructure is in place and operational, the network boxes 404*a-k* can be removed. This may benefit an installer since the building devices 408*a-h* may be in an operational state and any faults diagnosed and resolved before the permanent network infrastructure of building 10 is installed.

Figure 7:
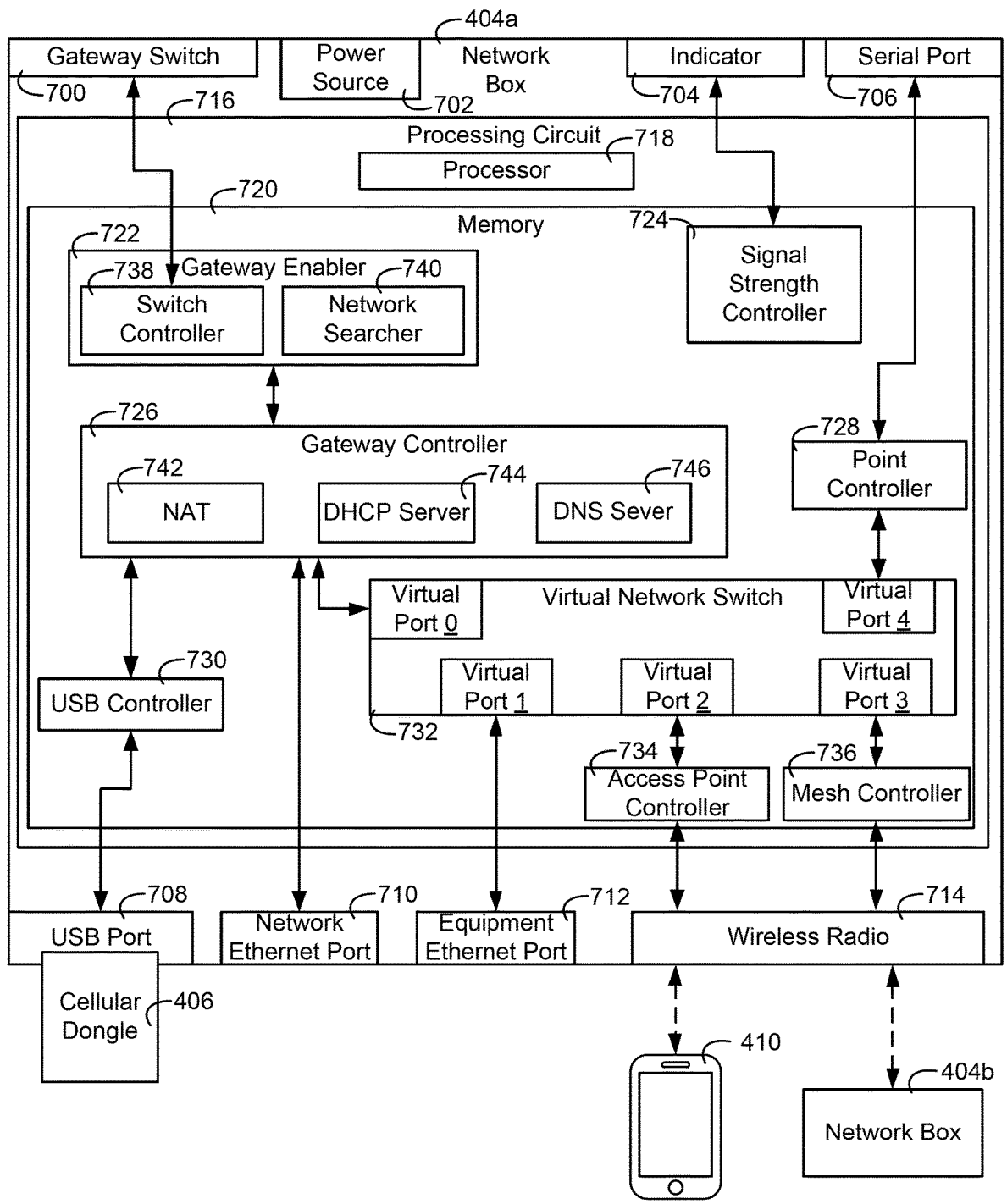
FIG. 7 is a block diagram of a network box of one of the service network of FIGS. 4-6 shown in greater detail, according to an exemplary embodiment.

Referring now to FIG. 7, one of network boxes 404*a-k*, network box 404*a*, as described with reference to FIGS. 4-6, is shown in greater detail, according to an exemplary embodiment. Network box 404*a* is shown to include gateway switch 700, power source 702, indicator 704, and serial port 706. Gateway switch 700 may be a physical button, physical switch, touch screen, and/or other device that allows a user to input an indicator to network box 404*a*. Gateway switch 700 can allow a technician to cause network box 404*a* to operate as a gateway even if network box 404*a* is unable to connect to the Internet (e.g., via cellular dongle 406 and/or network Ethernet port 710). This may be the case since some features of network box 404*a* such as dynamic host configuration protocol (DHCP) features and domain name service (DNS) features, as implemented by DHCP server 744 and DNS server 746, may be desired to be available in network box 404*a* even if network box 404*a* is not directly acting as a gateway to the Internet. In some embodiments, DNS server 746 provides resolution of a domain name (e.g., "www.google.com") to a corresponding IP address (e.g., "74.125.224.72"). Similarly, one of the devices in mesh network 500, such as one of network boxes 404*a-k* may have a corresponding name that can be resolved into an IP address by DNS server 746.

Power source 702 may be any kind of permanent and/or temporary power source. In some embodiments, power source 702 is a battery while in various embodiments, power source 702 is a connection port for permanent power source (e.g., AC power and/or DC power) such as a wired 24 VAC, 120 VAC, and/or 240 VAC connection. In various embodiments, power source 702 may include both a port for permanent power and/or a power circuit and a battery. In some embodiments, network box 404*a* connects to a piece of building equipment via power source 702 and receives power from the piece of building equipment. In this regard, power source 702 can be configured to power network box 404*a* when there is no permanent power source. Further, power source 702 can be configured to power network box 404*a* via the permanent power source if the permanent power source is connected to power source 702. For example, a power circuit (e.g., power filters, rectifiers, power regulators) can receive power via a permanent power source of the building 10 and power the network box 404*a* to form a permanent network in the building 10. In various embodiments, when a permanent power source is plugged into power source 702, power source 702 is configured to charge a battery of power source 702. Since the power source 702 can be either or both of a battery or a permanent power connection, the network box 404*a* can be used in a temporary network (powered via the battery) and also left in a permanent network (powered via the permanent power connection).

Power source 702 can be a battery and can be configured to store and release a charge. In some embodiments, power source 702 is a rechargeable battery, a one-time use battery, a capacitor, and/or any other energy storing device. In some embodiments, power source 702 stores charge which can be used to power network box 404*a*. Power source 702 may be any type or combination of batteries, capacitors (e.g., super capacitors), and/or any other energy storage device. In some embodiments, the battery is a nickel cadmium (Ni—Cd) battery and/or a nickel-metal hydride (Ni—MH) battery. In various embodiments, the battery is a lithium ion battery and/or a lithium polymer battery.

Indicator 704 may be one of a plurality of light emitting diodes (LEDs), a numerical display, an audio emitter (e.g., a speaker), a tactile feedback device, a user interface and/or touch screen interface. Indicator 704 may indicate the signal strength of a connection with the closest (e.g., strongest signal strength) network box. In some embodiments, indicator 704 displays connection to another network box or no connection. In the case of a LED, the LED may be on when network box 404*a* can connect to another network box and off when network box 404*a* cannot connect to another network box. In this regard, a technician can use indicator 704 as a ranging aid when place multiple network boxes in a building.

Serial port 706 can be any serial interface for connecting building devices (e.g., building device 408) to network box 404a. In some embodiments, serial port 706 is a physical interface for RS-232, RS485, UART, USART, CAN, I2C, RS-422, SPI, BACnet, MIDI, etc. This may allow a device that cannot connect to network box 404a via an Ethernet connection to still connect to network box 404a.

USB port 708 may be a port for connecting a USB device to network box 404a. In some embodiments, USB port 708 is configured to allow cellular dongle 406 to connect to network box 404a and provide network box 404a access to the Internet and/or another network (e.g., an upstream network). Cellular dongle 406 may be any cellular dongle that provides network box 404a with an Internet connection or other upstream network connection, that is, a connection to a cellular tower (e.g., cellular tower 402). Cellular dongle 406 is described with further reference to FIGS. 4-6. An "upstream network connection" or an "upstream network" may be another network that network box 404a can act as a gateway to. In various embodiments, an upstream network is a WAN such as the Internet.

Network Ethernet port 710 can be an Ethernet port for connecting to the Internet or another upstream network. In some embodiments, network Ethernet port 710 is a port for connecting network box 404a to a router, a network switch, and/or a modem. Network Ethernet port 710 may be labeled to indicate that network Ethernet port 710 is meant to be used in connecting network Box 404a to an Internet connection. Equipment Ethernet port 712 may be an Ethernet port for connecting building equipment (e.g., building device 408) to network box 404a. Equipment Ethernet port 712 may be the physical medium which network box 404a sends data to and/or receives data from the equipment connected to equipment Ethernet port 712.

Wireless radio 714 may be any kind of wireless transmitter and/or receiver. In some embodiments, wireless radio 714 is a plurality of similar and/or dissimilar wireless radios. Wireless radio 714 can be configured to communicate with other network boxes and/or provide a wireless access point for user devices or building devices. In some embodiments, wireless radio 714 is a radio configured to communicate via Wi-Fi, Zigbee (e.g., Zigbee IP, Zigbee Pro Green Power), Bluetooth, LoRa, a local area network (LAN), a metropolitan area network (MAN), a wide area network (WAN) (e.g., the Internet), adhoc wireless communication (e.g., MANET, VANET, SPANET, iMANET), and/or any other type of wireless communication.

Network box 404a is shown to include processing circuit 716. Processing circuit 716 is shown to include processor 718 and memory 720. Processing circuit 716 can be configured to perform some and/or all of the functionality of network box 404a. Processing circuit 716 is shown to include a processor 718 and memory 720. Processor 718 can be a general purpose or specific purpose processor, an application specific integrated circuit (ASIC), one or more field programmable gate arrays (FPGAs), a group of processing components, or other suitable processing components. Processor 718 may be configured to execute computer code and/or instructions stored in memory 720 or received from other computer readable media (e.g., CDROM, network storage, a remote server, etc.). In some embodiments, memory 720 stores a linux operating system, the linux operating system can facilitate some and/or all of the functionality of the components of memory 720.

Memory 720 can include one or more devices (e.g., memory units, memory devices, storage devices, etc.) for storing data and/or computer code for completing and/or facilitating the various processes described in the present disclosure. Memory 720 can include random access memory (RAM), read-only memory (ROM), hard drive storage, temporary storage, non-volatile memory, flash memory, optical memory, or any other suitable memory for storing software objects and/or computer instructions. Memory 720 can include database components, object code components, script components, or any other type of information structure for supporting the various activities and information structures described in the present disclosure. Memory 720 can be communicably connected to processor 718 via processing circuit 716 and can include computer code for executing (e.g., by processor 718) one or more processes described herein.

Memory 720 is shown to include gateway enabler 722, signal strength controller 724, gateway controller 726, point controller 728, USB controller 730, virtual network switch 732, access point controller 734, and mesh controller 736. Gateway enabler 722 can be configured to enable and/or disable gateway controller 726. In some embodiments, gateway enabler 722 can cause network box 404a to act as an access point and a node of a mesh network and/or can additionally cause network box 404a to act as a gateway to the Internet or another network by enabling and/or disabling gateway controller 726.

Gateway enabler 722 is shown to include switch controller 738 and network searcher 740. Switch controller 738 can be configured to communicate with gateway switch 700. Gateway switch 700 may indicate that a technician wants to enable gateway controller 726 even if network box 404a itself does not have access to the Internet or another upstream network. For example, a technician may want to keep the services performed by DHCP server 744 and DNS server 746 enabled even if USB port 708 does not have a cellular dongle 406 and network Ethernet port 710 is not connected to the Internet. In some embodiments, gateway switch 700 may include multiple settings. One setting may be an automatic setting where the network box 404a can automatically enable the gateway features of the network box 404a if the network box 404a determines that it is connected to an upstream network via USB port 708 and/or network Ethernet port 710. In some embodiments, another setting of the gateway switch 700 is an always off setting where the network box 404a never acts as a gateway. In some embodiments, the setting of the gateway switch 700 is an always on setting where the network box 404a always attempts to act as a gateway regardless to whether the network box 404a is connected to an upstream network via USB port 708 and/or network Ethernet port 710.

Network searcher 740 can be configured to determine if there is an upstream network connection for network box 404 via USB port 708 and/or network Ethernet port 710. In some embodiments, network searcher 740 can determine if there is a network providing network box 404a with a DHCP address via one or both of USB port 708 and network Ethernet port 710. In response to determining that network box 404a is being provided with a DHCP address (e.g., it is connected to the Internet or another upstream network), network searcher 740 can be configured to enable gateway controller 726.

Gateway controller 726 can be configured to be enabled and/or disabled by gateway enabler 722. In some embodiments, gateway controller 726 can communicate with networks (e.g., the Internet) via cellular dongle 406 and/or network Ethernet port 710. Gateway controller 726 may provide the network connection it receives via cellular dongle 406 and/or network Ethernet port 710 to virtual network switch 732. This may be done via virtual port 0. Gateway controller 726 is shown to include various components for acting as a gateway. Gateway controller 726 is shown to include network address translation (NAT) 742, dynamic host configuration protocol (DHCP) server 744, and domain name service (DNS) server 746.

DNS server 746 can be configured to perform DNS functions for the network boxes connected to network box 404*a* via wireless radio 714, user devices (e.g., user device 410) connected via the wireless radio, or building equipment connected via equipment Ethernet port 712. DNS server 746 can be configured to resolve domain names into Internet protocol (IP) addresses. DNS server 746 may store a corresponding IP addresses for a plurality of domain names. In various embodiments, DNS server 746 can communicate to another DNS (e.g., communicate to an Internet service provider (ISP) or another DNS connected to the Internet) via cellular dongle 406 and/or network Ethernet port 710 in response to receiving a request for a domain name for which DNS server 746 does not store the corresponding IP address.

DHCP server 744 can be configured to dynamically provide IP addresses to the network boxes connected to network box 404*a* via wireless radio 714, user devices (e.g., user device 410) connected via wireless radio 714, and/or building equipment connected via equipment Ethernet port 712. DHCP server 744 can be configured to provide the devices with IPv4 and/or IPv6 IP addresses. In some embodiments, DHCP server 744 receives requests for IP addresses from each of the of the devices that communicate to network box 404*a* and provides the requesting devices with IP addresses.

NAT 742 can be configured to translate between a public IP address that gateway controller 726 uses to communicate via the Internet or another upstream network (e.g., communicate via cellular dongle 406 and/or network Ethernet port 710) and the private IP address assigned to each of the network boxes, pieces of building equipment, and/or user devices that communicate via wireless radio 714 and/or equipment Ethernet port 712. In some embodiments, the private IP addresses assigned to each of the network boxes, user devices, or pieces of building equipment are the IP address assigned by DHCP server 744.

Signal strength controller 724 can be configured to cause indicator 704 to display a current signal strength to a nearby network box. In some embodiments, based on signals received from various network boxes via wireless radio 714, signal strength controller 724 can be configured to display the signal strength to of wireless connections to the nearby network boxes. In some embodiments, a technician may look at indicator 704 to determine if network box 404*a* is properly positioned with respect to the other network boxes. Indicator 704 may indicate whether network box 404*a* is in range of at least one other network box and/or may indicate the strength of the connection to the other network box.

Point controller 728 can be configured to communicate to building devices (e.g., building device 408) via serial port 706. Point controller 728 can be configured to discover points on the building devices connected via serial port 706 and transmit the discovered points to an Internet server. Data that is measured by the building device for the discovered points may be routed to the Internet server by point controller 728 while changes made to the points on the Internet server may be routed to the device via point controller 728.

Virtual network switch 732 can be a network switch configured to connect virtual ports 0-4. Virtual network switch 732 can be configured to connect various devices (e.g., user device 410, network boxes, etc.) to all be part of the same network. Virtual ports 1-4 may be connections between the equipment Ethernet port 712, technician devices via wireless radio 714, and network boxes in a mesh network via wireless radio 714. Virtual port 0 may be a port to the Internet or another network via network Ethernet port 710 and/or cellular dongle 406. In this regard, technician devices and/or other network boxes can communicate to the Internet via virtual ports 1-4 and virtual port 0. Further, the various devices communicating on virtual ports 1-4 can be configured to communicate with each other via virtual network switch 732.

Access point controller 734 can be configured to act as an wireless access point for mobile devices such as user device 410. Access point controller 734 can be configured to connect user device 410 to the Internet via virtual network switch 732 and/or gateway controller 726. An access point for user device 410 can allow a technician to look of various equipment specifications, generate reports for equipment testing, etc. In some embodiments, network box 404*a* has gateway controller 726 enabled. In this regard, user device 410 can communicate via wireless radio 714 and can communicate over the Internet via cellular dongle 406 and/or network Ethernet port 710. In another embodiments, network box 404*a* does not have gateway controller 726 is not enabled on network box 404*a*. In this regard, user device 410 may communicate to wireless radio 714 and access point controller 734 can be configured to route data to/from user device 410 to another network box that does have connection to the Internet (e.g., network box 404*b*). This routing may be facilitated by mesh controller 736.

Mesh controller 736 can be configured to route data over a mesh network (e.g., mesh network 500). Mesh controller 736 can be configured to determine network boxes (e.g., network box 404*b*) that are connected to network box 404*a* and/or network boxes that are in a mesh network with network box 404*a*. Mesh controller 736 can be configured to form a mesh network with other network boxes, allowing network box 404*a* to transmit data from network box 404*a* to other network boxes via the mesh network. Mesh controller 736 may use standards such as IEEE 802.11s to implement a mesh network between network boxes. Mesh controller 736 may utilize stored information (e.g., stored and/or shared information) regarding the links between various network boxes to determine the most efficient path in the mesh network to forward data. In some embodiments, mesh controller 736 causes wireless radio 741 to transmit signals that seek out other network boxes to automatically form a mesh network.

Mesh controller 736 can be configured to establish links with other network boxes for the purpose of being able to forward data packets on each other's behalf. This concept of forwarding packets is what makes it possible for data at one network box to be passed from network box to network box to reach its destination on another network box, on building equipment, or the Internet, even when the source and destination devices are not in direct range of each other. When forwarding information, mesh controller 736 can be configured to use the stored links between network box to determine a quickest path for sending data from one network box to another network box.

Figure 8:
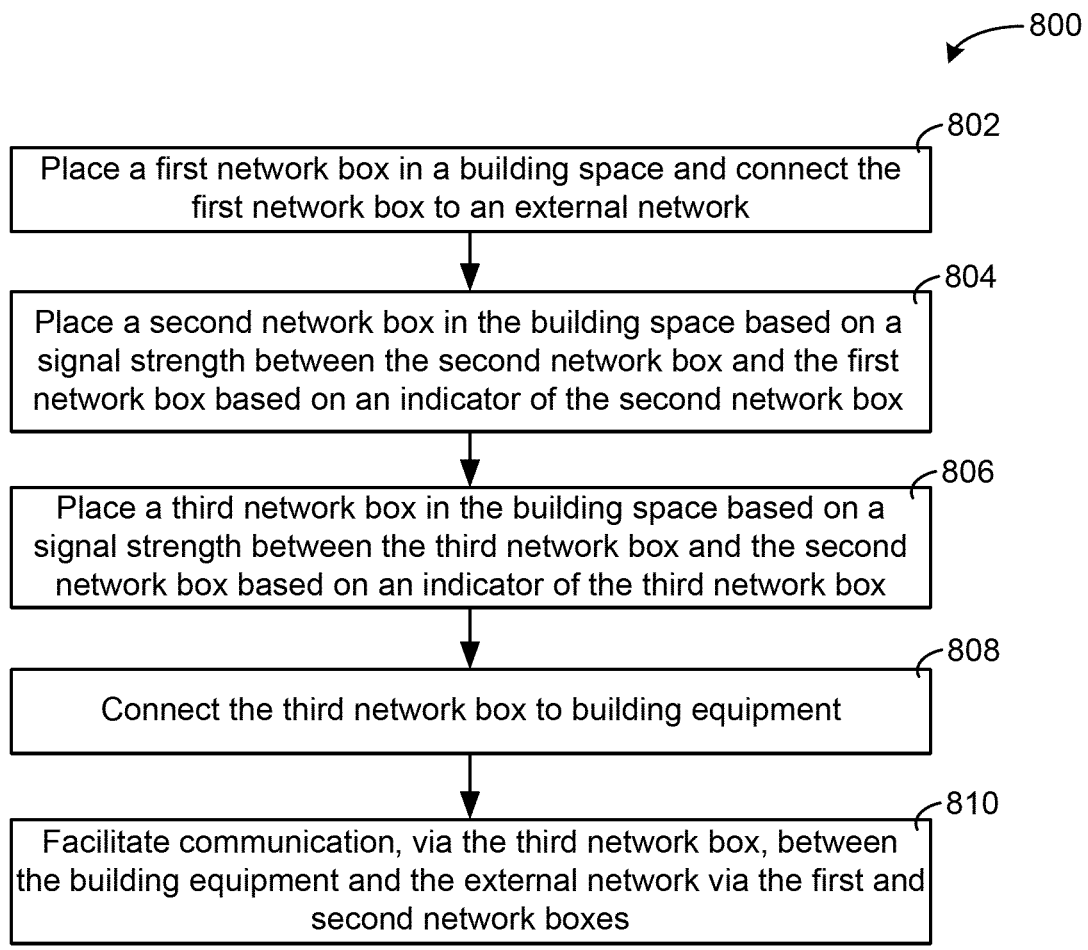
FIG. 8 is a flow diagram of a process for providing a piece of building equipment connectivity to an external network via one or more of the network boxes of FIG. 7, according to an exemplary embodiment.

Referring now to FIG. 8, a flow diagram of process 800 is shown for placing network boxes in a building to connect building equipment to an external network (e.g., the Internet). In step 802, a technician may place a first network box in a building space and connect the network box to the Internet. In some embodiments, the technician may connect the network box to the Internet via cellular dongle 406 and/or network Ethernet port 710. Connecting the network box to the Internet may cause the network box to act as a gateway, thus, gateway enabler 722 can enable gateway controller 726 of the network box.

In step 804, the technician may place a second network box in the building space based on a signal strength indicated by indicator 704, indicator 704 indicating the signal strength between the second network box and the first network box. In step 806, a technician may place a third network box based on an indicator 704 of the third network box indicating the wireless connection between the third network box and the second network box. Step 806 can be repeated by a technician as many times as necessary, adding as many network boxes as needed, to reach the building equipment. Each successive network box may be placed between the previously-placed network box and the building equipment to extend the network closer to the building equipment.

Although three network boxes are used in this example, it is contemplated that any number of network boxes can be placed or installed to reach the building equipment. In some embodiments, only one network box may be required (e.g., the first network box is within range of the building equipment). In other embodiments, two network boxes may be sufficient to reach the building equipment. In other embodiments, three or more network boxes may be installed to reach the building equipment. Each network box may connect to the previous network box installed and/or any other network boxes within range.

In step 808, the last box installed, in this case the third box, is connected to the building equipment. In step 810, the third box can facilitate communication between the third box and the second box, the second box and the first box, and the first box and the Internet. Based on the chain of network boxes, the building equipment can be connected to the Internet. In some embodiments, the first network box, the second network box, and the third network box for a mesh network, wherein various paths for forwarding data packets can be formed. In various embodiments, the network formed by the network boxes is start network typology, a bus network typology, a ring network topology, etc.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A temporary building network system for a building, the system comprising:
a plurality of portable network devices forming a temporary network for the building, wherein the plurality of portable network devices comprise a first network device and a second network device;
wherein the first network device comprises:
an energy storage device configured to store energy and power the first network device using the stored energy;
a wireless radio configured to communicate with the second network device via the temporary network;
an indicator device configured to dynamically indicate a wireless radio connection strength to a user in real time as the first network device physically moves through the building for a wireless connection between the first network device and the second network device, the wireless radio connection strength indicating whether installing the first network device at a current location is a suitable installation location of the first network device that would place the first network device within communication range of the second network device when setting up the temporary network; and
a processing circuit configured to:
cause the wireless radio to communicate with the second network device via the temporary network;

determine the wireless radio connection strength for the wireless connection between the first network device and the second network device based on a communication with the second network device via the temporary network; and cause the indicator device to dynamically indicate the determined wireless radio connection strength to the user.

2. The system of claim 1, wherein the energy storage device is configured to power the wireless radio, the indicator device, and the processing circuit using the stored energy.

3. The system of claim 1, wherein the temporary network is a wireless mesh network, wherein the processing circuit is configured to cause the wireless radio to communicate with the plurality of portable network devices to form the wireless mesh network.

4. The system of claim 1, wherein the first network device further comprises a wired communications interface configured to communicate, via one or more wires, with a building device, wherein the processing circuit is configured to connect the building device to the temporary network by:

receiving data from the building device via the wired communications interface; and causing the received data to be communicated via the temporary network via the wireless radio.

5. The system of claim 1, wherein the first network device further comprises a cellular communications port configured to connect a cellular dongle to the first network device;

wherein the processing circuit of the first network device is configured to connect the temporary network to a second network by communicating with one or more cellular communications devices via the cellular dongle connected to the cellular communications port.

6. The system of claim 1, wherein the first network device further comprises a permanent power circuit configured to power the first network device using power received from a permanent power source.

7. The system of claim 1, wherein the first network device further comprises a wired communications port configured to connect to a second network via one or more wires;

wherein the processing circuit is configured to connect the temporary network to the second network by communicating with the second network via the wired communications port.

8. The system of claim 1, wherein the processing circuit is configured to cause the wireless radio to connect a building device to the temporary network by wirelessly communicating with the building device via the wireless radio.

9. The system of claim 8, wherein the building device is at least one of an environmental control device configured to control an environmental condition of the building or a mobile user device associated with the user.

10. The system of claim 1, wherein the processing circuit is configured to:

determine that the first network device is connected to a second network via at least one of a wired communications port of the first network device configured to connect the first network device to the second network via one or more wires or a cellular communications port of the first network device configured to connect the first network device to the second network via a cellular dongle connected to the cellular communications port; and enable one or more gateway functions causing the first network device to operate as a gateway between the second network and the temporary network.

11. The system of claim 10, wherein the first network device further comprises a selector configured to receive a selection, from the user, to operate the first network device as the gateway;

wherein the processing circuit is configured to enable the one or more gateway functions causing the first network device to operate as the gateway between the second network and the temporary network in response to a determination that the selection to operate the first network device as the gateway is received from the user via the selector.

12. The system of claim 10, wherein the one or more gateway functions comprise at least one of a network address translation (NAT) function, a dynamic host configuration protocol (DHCP) server function, and a domain name service (DNS) function.

13. The system of claim 1, wherein the second network device is a network device of the plurality of portable network devices that provides a strongest wireless radio connection strength to the first network device.

14. The system of claim 1, wherein at least one of the plurality of portable network devices form a permanent network in the building after being installed.

15. A first network device for a temporary network of a building, wherein the first network device is a portable device, the first network device comprising:

an energy storage device configured to store energy and power the first network device using the stored energy;

a wireless radio configured to communicate with a plurality of portable network devices of the temporary network via the temporary network;

an indicator device configured to indicate a wireless radio connection strength to a user for a wireless connection between the first network device and the plurality of portable network devices as the first network device physically moves through the building, the wireless radio connection strength indicating whether installing the first network device at a current location is a suitable installation location of the first network device that would place the first network device within communication range of one of the plurality of portable network devices when setting up the temporary network; and a processing circuit configured to:

cause the wireless radio to communicate with the plurality of portable network devices via the temporary network;

determine wireless radio connection strengths for wireless connections between the first network device and the plurality of portable network devices based on communications with the plurality of portable network devices via the temporary network;

select a wireless radio connection strength to indicate to the user by comparing relative strengths of the wireless radio connection strengths between the first network device and the plurality of portable network devices; and cause the indicator device to indicate the selected wireless radio connection strength to the user.

16. The first network device of claim 15, wherein the temporary network is a wireless mesh network, wherein the processing circuit is configured to cause the wireless radio to communicate with the plurality of portable network devices to form the wireless mesh network.

17. The first network device of claim 15, wherein the first network device further comprises a wired communications interface configured to communicate, via one or more wires, with a building device, wherein the processing circuit is configured to connect the building device to the temporary network by:
receiving data from the building device via the wired communications interface; and
causing the received data to be communicated via the temporary network via the wireless radio.

18. The first network device of claim 15, wherein the first network device further comprises a cellular communications port configured to connect a cellular dongle to the first network device;
wherein the processing circuit is configured to connect the temporary network to a second network by communicating with one or more cellular communications devices via the cellular dongle connected to the cellular communications port.

19. The first network device of claim 15, wherein the processing circuit is configured to:
determine that the first network device is connected to a second network via at least one of a wired communications port of the first network device configured to connect the first network device to the second network via one or more wires or a cellular communications port of the first network device configured to connect the first network device to the second network via a cellular dongle connected to the cellular communications port; and
enable one or more gateway functions causing the first network device to operate as a gateway between the second network and the temporary network.

20. The first network device of claim 15, wherein at least one of the first network device or the plurality of portable network devices form a permanent network in the building after being installed.

21. A method for communicating via a temporary network of a building, the method comprising:
powering, by a first network device, the first network device via an energy storage device of the first network device using energy stored by the energy storage device, wherein the first network device is a portable device;
causing, by the first network device, a wireless radio of the first network device to communicate with a second network device via the temporary network, wherein the second network device is another portable device;
determining, by the first network device, a wireless radio connection strength for the wireless connection between the first network device and the second network device in real time as the first network device physically moves through the building based on a communication with the second network device via the temporary network, the wireless radio connection strength indicating whether installing the first network device at a current location is a suitable installation location of the first network device that would place the first network device within communication range of the second network device when setting up the temporary network;
causing, by the first network device, an indicator device of the first network device to indicate the determined wireless radio connection strength to a user;
installing the first network device at a physical location within the building at which the first network device is within communication range of the second network device based on the determined wireless radio connection strength;
receiving, by the first network device, data from a building device via a wired communications interface of the first network device; and
causing, by the first network device, the received data to be communicated via the temporary network via the wireless radio of the first network device.

22. The method of claim 21, wherein the temporary network is a wireless mesh network, wherein the method further comprises causing, by the first network device, the wireless radio of the first network device to communicate with a plurality of network devices comprising the second network device to form the wireless mesh network.

23. The method of claim 21, wherein at least one of the first network device or the second network device form a permanent network in the building after being installed.

* * * * *